F. W. ROLLER.
ELECTRICAL MEASURING INSTRUMENT.
APPLICATION FILED JULY 13, 1908.
1,050,563.
Patented Jan. 14, 1913.
Fig. 1
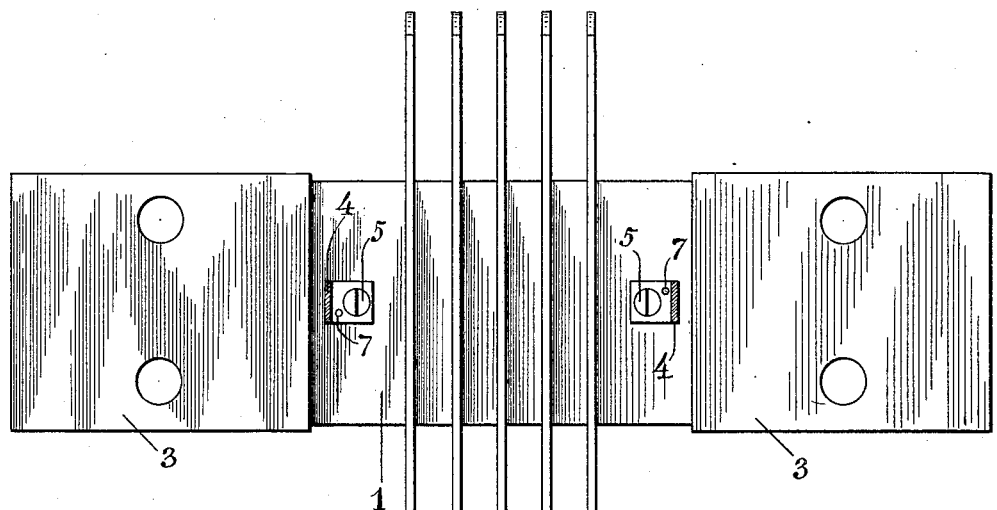
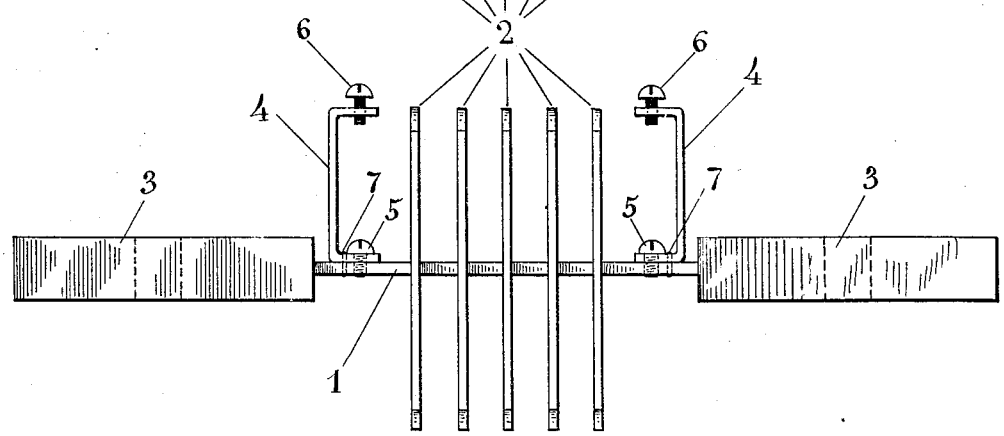
Fig. 2

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

1,050,563.  Specification of Letters Patent.  Patented Jan. 14, 1913.

Application filed July 13, 1908. Serial No. 443,231.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a full, clear, and exact specification.

My invention relates to electrical measuring instruments, and particularly to shunts used in connection with ammeters for measuring currents of comparatively large value.

In the measurement of large currents it is customary to use a shunt in the main circuit and associate therewith a sensitive measuring instrument which will be subjected to the drop in potential which occurs in the shunt or portion thereof. The drop in potential is of course dependent upon the strength of current passing through the shunt, and the instrument will therefore indicate the amount of main current passing if properly calibrated.

One object of my invention is to secure an improved shunt which will be interchangeable with different indicating instruments and I provide means whereby the drop between the instrument leads may be made the same when the same current is flowing in all shunts of a certain capacity.

In the manufacture of shunts for any given capacity, absolute uniformity in size and resistance is difficult if not commercially impossible, and the variation is sufficient to cause considerable variation in the readings when different shunts are used in conjunction with a given measuring instrument. In practice, this difficulty is usually overcome by providing an instrument for each shunt and calibrating the instrument when used in connection with this particular shunt. In this way substantially accurate readings are obtained when an instrument is used in conjunction with its shunt, but if used with any other instrument, serious inaccuracies will result. The shunts and instruments are therefore not interchangeable, and this absence of interchangeability is objectionable to the user as well as to the manufacturer not only on account of the inconvenience but also the increased cost to the both parties. In an endeavor to overcome this difficulty, the shunt after manufacture may be tested and afterward changed in its form or proportions so as to give a certain standard drop in potential when a current of the capacity of the shunt is passed through the same. This may require several successive tests and changes in the shunt and is not only a tedious process but considerably increases the cost of manufacture and is not readily applicable to all forms of shunts. One method which approaches the obtaining of interchangeable shunts to some degree consists in testing the shunt with a standard instrument and ascertaining as closely as possible the proper points of connection in the body of the shunt to give the desired standard drop in milli-volts. However in adding the terminals to the shunt for the instrument leads after the proper points of connection in the body of the shunt have been ascertained, various inaccuracies will result due to slight displacement in exact location of the terminals, and this will cause a wide difference in the reading of the instrument. Some means must therefore be provided in order to secure desired accuracy, and this is accomplished by means of my invention.

Another object of my invention is to overcome the inaccuracies introduced in a shunted instrument by reason of the electromotive force due to the thermo-electric action when joints formed between different metals in the circuit are at different temperatures. In customary forms of shunts the main terminals are of copper and the resistance body is of different material, and therefore if the joints between the latter material and the main terminals are at different temperatures, a resultant electromotive force is developed due to thermo-electric action which will introduce an error in the readings of the ammeter. By means of my invention this difficulty is overcome.

These and other objects of my invention will be understood from the following description and accompanying drawings, in which—

Figure 1 is a plan view, with certain parts broken away, of one form of shunt embodying my invention; and Fig. 2 is a side view thereof.

The resistance body of the shunt of any suitable material is shown at 1 having flanges 2 for radiating heat from the body of the shunt and as more fully explained and described in my Patent No. 859,255, granted July 9, 1907. The resistance body is shown as having united therewith the main terminals 3 for connection in the main circuit, the current in which is to be measured. These main terminals will usually be of copper and the resistance body of suitable higher resistance material such as resistance alloy or iron. Instead of forming the terminals for the instrument leads on the main terminals, I prefer to form them upon the resistance body 1 and thereby avoid introduction of error in readings due to any difference in thermo-electromotive force occurring between the body 1 and the main terminals 3. If, however, the instrument leads of copper or other material different from that of the resistance body 1, were joined directly to the resistance body an error due to thermo-electric action might still be introduced if there were any difference in temperature between the points of connection. I prefer to secure to the resistance body, extensions 4 of the same material as the resistance body or of a material having no appreciable thermo-electromotive force against said resistance body, and preferably of long length and small width, such as a strip of sheet metal as indicated. The extensions or strips 4 will preferably be of such proportions as to have small resistance compared with the resistance of the normal instrument circuit. The strips 4 are shown as bent over at their ends and secured at their lower ends to the resistance body as by screws 5. The outer ends of the strips will be connected to the leads from the measuring instrument and screws 6 are shown for making connections with the instrument leads. By this construction I avoid any material error due to thermo-electric action because even though the instrument circuit passes through joints at the outer ends of the strips formed between metals of different materials, yet by reason of the length, small width and large radiating surface of the strips 4, the terminals 6 will have the same temperature substantially, even though there is a difference of temperature between the inner ends of the strips.

Referring now to the means for adjustment in order to secure a certain standard drop between the terminals for the instrument leads and thereby secure interchangeability, it will be seen that the screw 5 is eccentrically located with reference to the contact area between the strip 4 and the shunt body, and as the strip 4 is turned about the screw 5 a gradual change in the location of the contact area along the length of the resistance body 1 will result.

In obtaining the proper position of the extensions or strips 4 on the resistance body 1, the holes for the screws 5 will first be drilled in the resistance body as nearly as possible in their proper position and the extensions or strips 4 will then be secured in place. A standard instrument will then be connected to the screws 6 and a current of accurately known value passed through the main shunt. If the reading of the instrument does not correspond with the known value of the current, the operator will loosen one or both of the screws 5 and adjust the position of one or both of the strips around the screws 5 to such locations that the instrument will give a correct reading. Thus, if the reading given by the standard instrument is too high, the drop between the terminal connections will then be too large which may be corrected by adjusting the position of one or both of the strips 4 so that the contact areas will be nearer the middle of the shunt. On the other hand, if the reading of the instrument is too low, they will be adjusted to such a position that the contact area of the strips will be shifted away from the middle of the shunt. After the proper location of the strips have been ascertained, a small hole may be drilled through the inner end of each strip 4 and, if desired, a positioning pin 7 inserted in order to insure the proper re-location of the strips in case they are removed for any purpose or happen to be displaced. I thus secure a form of shunt which may be readily adjusted to compensate for lack of uniformity occurring during the process of manufacture, and also one which is interchangeable with others when used with any standard instrument.

It will be seen that my invention not only presents the advantage of interchangeability of shunts and ammeters of the same capacity, but also shunts of certain capacities may be used in conjunction with ammeters of different capacities, and vice versa. Thus, by calibrating all shunts to a standard drop of 50 millivolts, for example, a 1000 ampere shunt when used in conjunction with an instrument scaled for 500 amperes will give an accurate reading by multiplying the reading of the instrument by 2, or if used in conjunction with an ammeter scaled for 2000, the correct reading will be obtained by dividing the indication of the needle by 2. This will be understood because if the 1000 ampere current gives a drop of 50 milli-volts in the 1000 ampere shunt, the needle of the 500 ampere instrument is calibrated to give such deflection with a drop of 50 milli-volts. Consequently, the reading of the instrument should be multiplied by 2 when used with a 1000 ampere shunt. Similarly, when such shunt is used with an ammeter scaled for 2000 amperes capacity, the passage of 1000 amperes will deflect the needle to read 2000 and this divided by 2 will give the correct current.

Of course, if desired, double scales may be provided on the instrument and it will also be evident that the construction of instruments for shunts of all capacities are the same, the difference being only in the scale used.

It will be understood that my improved means for securing proper adjustment of the terminals for the instrument leads may be applied to one terminal only where sufficient range of adjustment is provided in said terminal.

Although I have shown and described one form of shunt embodying my invention, it will be understood that my invention may be applied to various other types and forms of shunts and embodied in various forms of construction without departing from the scope thereof.

Having thus described my invention, I declare that what I claim as new and desire to secure by Letters Patent, is—

1. A shunt for electrical measuring instruments comprising a resistance body one or more conducting portions fixed to said body and adapted to be connected to instrument leads, said conducting portion or portions having positioning means eccentrically related to the area of contact between said conducting portion or portions and said resistance body.

2. A shunt for electrical measuring instruments comprising a resistance body, conducting portions fixed to said body, and means whereby the contact area of one or more of said conducting portions may be shifted on said body.

3. A shunt for electrical measuring instruments, comprising a resistance body, a conducting portion adapted to be connected to an instrument lead having an area of contact with said resistance body, and means eccentrically related to said area of contact for securing said conducting portion in position.

4. As an article of manufacture, a shunt for electrical measuring instruments, comprising in combination a resistance body having terminals for connection in the circuit, and means for electrically connecting the leads of an electrical measuring instrument with said resistance body, said means comprising conducting portions of a material having no appreciable thermo-electromotive force with respect to said resistance body and adapted to be connected to the instrument leads at points located remote from said resistance body.

5. As an article of manufacture, a shunt for electrical measuring instruments, comprising in combination with a resistance body having terminals for connection in the circuit, of conducting portions of long length and small width secured to said resistance body and of the same material as said resistance body and adapted to be connected to the leads of an electrical measuring instrument at points located remote from said resistance body.

6. As an article of manufacture, a shunt for electrical measuring instruments, comprising in combination a resistance body having terminals for connection in the circuit, and means for electrically connecting the leads of an electrical measuring instrument with said resistance body, said means including conducting portions of a material having no appreciable thermo-electromotive force with respect to said resistance body and adapted to be connected to the leads at points having substantially the same temperature.

7. As an article of manufacture, a shunt for electrical measuring instruments, comprising in combination with a resistance body having terminals for connection in the circuit, of conducting portions of a material having no appreciable thermo-electromotive force against said resistance body and connected to said resistance body, said conducting portions being adapted to be connected to the leads of a measuring instrument at points having substantially the same temperature.

8. A shunt for electrical measuring instruments, having a resistance body, conducting portions for the instrument leads secured to said resistance body and of material having no appreciable thermo-electromotive force against said resistance body, said conducting portions having the points of connection of the instrument leads located at a distance from the points of connection to said resistance body, and means for adjustably securing at least one of said conducting portions to said body.

In testimony whereof I affix my signature, in presence of two witnesses.

FRANK W. ROLLER.

Witnesses:
L. K. SAGER,
GEO. A. HOFFMAN.